Aug. 31, 1943.   G. W. SAATHOFF   2,328,499
CONTROL SYSTEM FOR VAPOR GENERATORS
Original Filed Sept. 7, 1938   2 Sheets-Sheet 2

INVENTOR
George W. Saathoff

Patented Aug. 31, 1943

2,328,499

UNITED STATES PATENT OFFICE 2,328,499

CONTROL SYSTEM FOR VAPOR GENERATORS

George W. Saathoff, South Orange, N. J.

Original application September 7, 1938, Serial No. 228,818. Divided and this application July 8, 1941, Serial No. 402,061

9 Claims. (Cl. 236—14)

This application is a division of my copending application Serial Number 228,818, filed September 7, 1938, now Patent No. 2,258,719, dated Oct. 14, 1941.

This invention relates to apparatus useful in determining variable conditions in the operation of vapor generators, and in particular to combinations of apparatus for controlling or in guiding the controlling in most efficient manner, taking into account variations which may occur in conditions pertaining to the operation.

It is already appreciated that in the operation of a vapor generator there are three primary considerations to be satisfied if most desirable operation is to be attained. (1) Vapor outlet pressure indicative of heat level, will tend to vary primarily with load but also from many other causes and desirably is to be maintained at a predetermined standard although it may be allowed to vary with rating between certain predetermined limits. (2) From an economy standpoint there should be the most efficient combustion possible, with a minimum of heat loss in the flue gases, unburned carbon loss, refractory melting, and other limiting factors. (3) The absolute pressure in the furnace should be maintained at a predetermined value for every rate of operation such that a minimum of air infiltration or leakage will occur.

In the maintenance of optimum combustion efficiency the most practical guide is provided by an interrelation of steam flow rate and air flow rate. Steam outflow rate at designed temperature and pressure (heat content) value relative to the same weight rate of feed water inflow (at designed heat content) is indicative of B. t. u. absorption. Air flow rate is indicative of B. t. u. liberated. The interrelation of steam outflow rate with air flow rate is then continuously indicative of the relation of heat liberated to heat absorbed and consequently of the efficiency of combustion.

Air may be considered a fuel just as coal, oil, gas or any other combustible. The amount of air necessary to liberate 10,000 B. t. u. is practically constant no matter what the B. t. u. content of the fuel burned happens to be. Thus after proper determination of the limiting factors of operation, and adjustment, an air flow meter provides an accurate continuous indication of B. t. u. liberated, which may be used in conjunction with steam outflow rate as a guide to manual or automatic control of combustion.

A convenient way of determining or measuring "air flow" is in using the boiler as an orifice; i. e. determining the drop in pressure of the products of combustion across one or more of the boiler passes. In such measurement is included not only the gaseous products of combustion, but also any excess of air that may desirably or undesirably be present. It should be understood that for convenience and simplicity of language in the description and claims, all gases which flow through the boiler and to and through the stack, including the air, carbon dioxide, carbon monoxide, and any other gaseous products of combustion that may in any manner reach or travel with the gas stream, are generally referred to herein as "gases" or "air."

It will be appreciated that the steam flow—air flow relation, indicative of heat absorbed—heat liberated relation and consequently of combustion efficiency, is in certain respects a relation indicator and operating guide rather than an absolute measuring apparatus, and that the rate of steam outflow is a measure of heat absorbed relative to heat content of the feed water, only if the weight rate of feed water continuously coincides with the weight rate of steam outflow. This is not always the case, for momentary fluctuations in feed water supply rate and/or in steam outflow rate tend to prevent exact coincidence.

The boiler itself acts as a steam accumulator and its storage effect causes the heat input to the water or heat absorbed as measured in steam flow to fluctuate above or below the true absorption. For example, if rate of heat liberation and efficiency thereof remains constant, then a momentary decrease in feed water inflow rate will mean that some of the heat liberated will have to be absorbed by the storage effect of the metal and water of the boiler if the rate of steam outflow remains constant. Conversely, if there is a momentary increase in feed water supply, then heat is drawn from storage to raise this excess of water to the higher level or vaporize it.

It will be seen that momentary discrepancies between rate of water supply and rate of steam outflow utilize the storage effect of the boiler and that while a time average of the liquid inflow relative to vapor outflow will show that steam outflow rate is an adequate measure of B. t. u. absorbed in interrelationship with air flow as a measure of B. t. u. liberated for the guidance of operation; and although present day practice in the control of the rate of supply of feed water maintains such supply in substantial synchronism with rate of vapor outflow; still momentary discrepancies between feed supply and vapor outflow, or out-of-phase cycling of the two, dictate the desirablity of compensating the steam flow— air flow relationship for variations in rate of feed water supply.

I have found that operating inequalities tend to accumulate and magnify when left to themselves so that, for example, when there is a discrepancy between rate of liquid inflow and rate of vapor outflow a swing or hunt may be initiated and develop a serious situation. This is particularly possible where a number of boilers are operating in parallel. For example, if for some reason or other (such as inaccurate feed valve position) the feed water flow departs from the steam flow and no attempt is made to compensate for such discrepancy, the tendency is first to further reduce the water level in the boiler and at the same time the drum pressure tends to fall, resulting in a reduced steam outflow, which further reduces the water level in the boiler, due to subsidence, resulting in an accumulative effect tending to back the boiler off the load and causing the load to be thrown on to the other boilers which are connected thereto in parallel. With a feed water flow compensator such as I have herein provided, when an excess flow of water does occur, I immediately get a pick-up in heat flow through the boiler which tends to resist further drop in the water level and the falling off in drum pressure and thereby tends to stabilize the load on the boiler and on the group of boilers.

Thus a primary object of my invention is to provide apparatus sensitive to rate of feed water supply, its possible deviation from coincidence with rate of vapor outflow, the effect on combustion efficiency that such deviation may have, and apparatus continuously responsive to the sensitive apparatus for automatically regulating the operation of a vapor generator.

It will be appreciated that when I speak of boilers or steam flow or feed water I am not to be limited thereby for the contemplation of my invention is broadly to any type of a vapor generator supplied with a liquid which may be vaporized and which may for example be mercury, diphenyl, or similar vaporizable fluid.

I will now describe a preferred embodiment of the invention in connection with a steam generating boiler. The illustrations accompanying the present description are directed to vapor generators in general, rather than to a specific form or type of vapor generator.

Figure 1:
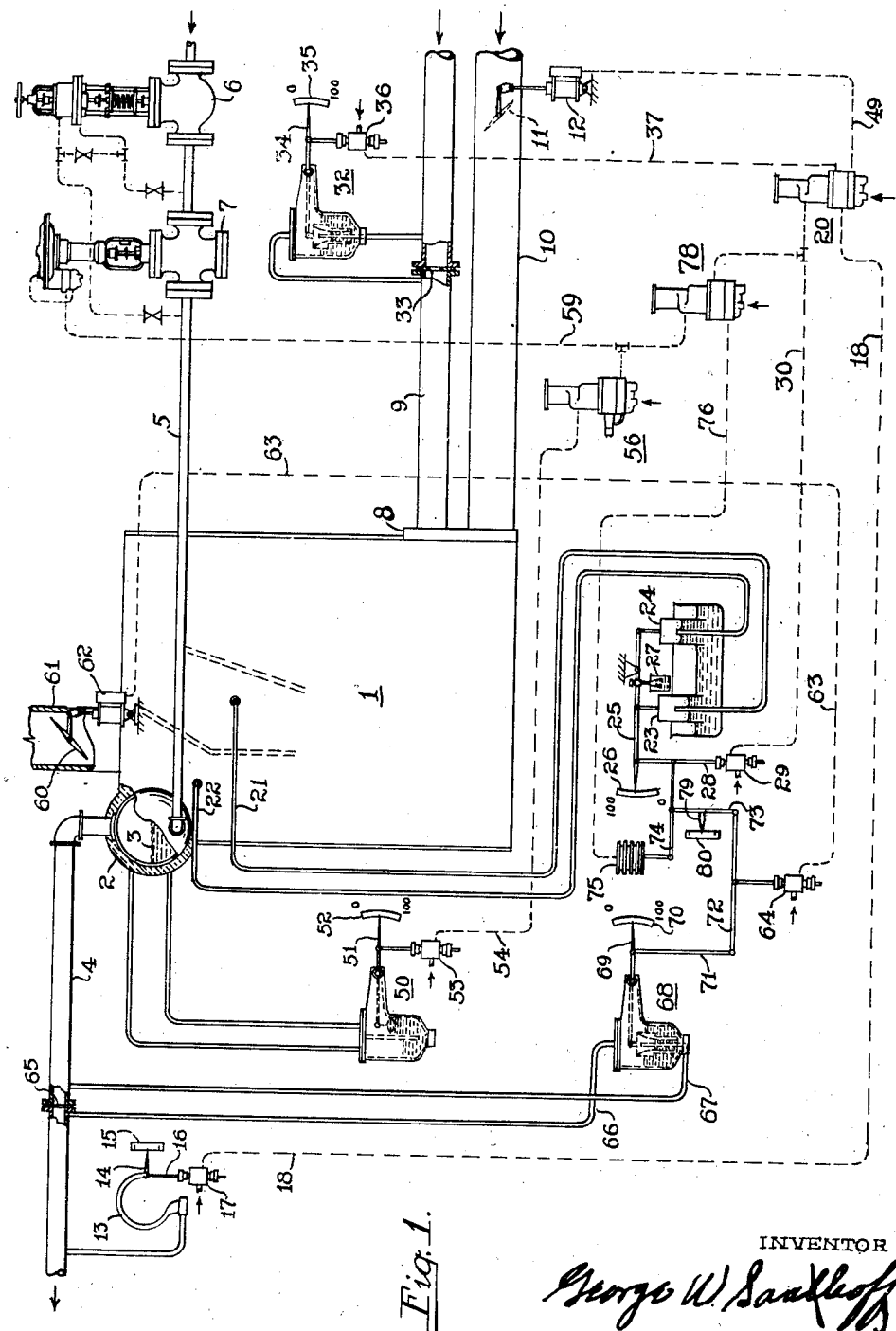
Figure 1 is a somewhat diagrammatic representation of a vapor generator to which the invention is directed.

Referring first to Fig. 1, I show therein a steam boiler or vapor generator 1 having a drum 2 providing a liquid-vapor separation zone and having a water level therein indicated at 3. Vapor generated passes from the drum 2 through a conduit 4 to any point of usage.

Feed water is supplied to the boiler through a conduit 5 in which are positioned an excess pressure regulating valve 6 and a feed water supply regulating valve 7, the latter positioned to maintain a desirable liquid level 3 in the drum 2.

The boiler furnace is provided with suitable burners (not shown) and has an air box 8 in conjunction with which are two sources of fuel, in the present instance a supply of coke oven gas through a conduit 9, and a supply of pulverized coal through a conduit 10. The material flowing through the conduit 10 is comprised of primary air as a carrier for and with the pulverized fuel. It is contemplated that normally all of the coke oven gas available will be utilized in the furnace and no provision is shown for regulating the rate of supply thereof. In connection with the supplying of pulverized fuel to the furnace, the rate of supply is under the control of the damper 11 positioned by a pneumatic actuator 12 as will hereinafter be explained.

It will be appreciated that the showing is somewhat diagrammatic in that the damper 11 is illustrated as being located in the conduit 10 containing both the primary air and the pulverized coal which it carries. Actually the damper would probably be located in the primary air duct ahead of the pulverizer, although not necessarily so. In any event it is representative of a control of pulverized coal as fuel supplied to the furnace 1.

In a vapor generator or boiler the steam pressure is an indication of the heat level and comprises a balance between the heat load upon the boiler and the heat input. Thus if the load demanded of the boilers is greater than the heat absorption the steam pressure will tend to fall, while if the load drops off relative to the rate of heat absorption the steam pressure will rise. It is desirable to maintain steam pressure as uniform as possible and at a predetermined value. However, it is not always essential that a predetermined definite value exist; the pressure may be allowed to vary within certain limits and have a different value for a different rate of operation. Assuming, however, that in the present instance I desire to maintain steam pressure at a predetermined value, then I desirably utilize an indication of such steam pressure in the control of the rate of supply of B. t. u. to the furnace so that should the steam pressure tend to fall I shall increase the rate of supply of fuel and vice versa.

In the preferred arrangement wherein steam pressure is a measure of heat level and air flow a measure of boiler output, excess air requirements may be maintained within close limits. The arrangement compensates for changes in B. t. u. value of the coal as well as for changes in the amount of coal carried by a given amount of primary air.

Figure 3:
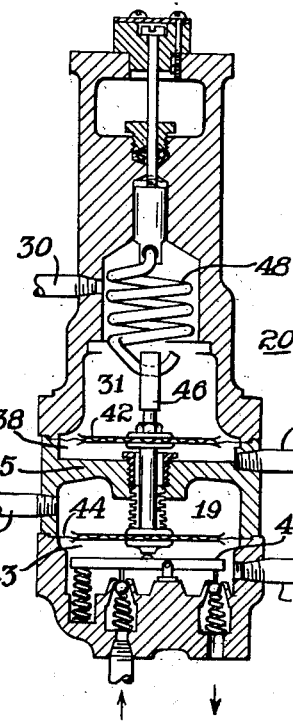
Fig. 3 is a sectional elevation of an averaging relay.

I illustrate in Fig. 1 a Bourdon tube 13 sensitive to the instantaneous value of steam pressure within the conduit 4 and adapted to position an indicator 14 relative to an index 15 for advising the value of steam pressure. The Bourdon tube 13 at the same time positions the stem 16 of a pilot valve 17 establishing an air loading pressure through the pipe 18 representative of steam pressure and effective within a chamber 19 of an averaging relay 20 (Fig. 3).

While in Fig. 1 I have indicated that the Bourdon tube 13 is connected to the steam outflow conduit 4 at a location somewhat remote from the drum 2 and at the outlet side of the orifice 65; this is not limiting in any extent. As a matter of fact it would probably always be preferable to have the Bourdon tube 13 (responsive to steam outflow pressure) connected as close to the drum 2 as possible, ahead of a superheater if any, and unaffected by any pressure condition of other boilers in the general system. In this way the pressure indication would be representative of the pressure adjacent the zone of generation and prior to the effect of any disturbing influences. Thus it would more nearly represent "heat level" in the vapor generator.

I desirably also utilize a measure of air flow in the control of fuel so that the fuel supply rate is in general moved with and is proportional to the air supplied to the furnace for combustion of the fuel.

I find it convenient to obtain a measure of the total air passing through the furnace by measuring the differential pressure of the products of combustion and excess air across a part at least of the path of flow through the gas passages. For example, the pipes 21 and 22 are tapped through the boiler setting, the former at a location of higher absolute pressure than the latter. Pressures are effective through the pipes 21, 22 to the underside of liquid sealed bells 23, 24 respectively. The bells are pivotally supported from a pivoted beam 25, having one end comprising an indicator movable relative to an index 26. From the beam 25 is freely suspended a displacer 27 dipping into another liquid, preferably mercury, and adjustable along the beam to vary its effectiveness in counteracting a tendency to rotation of the system comprising the beam 25 and the bells 23, 24.

The displacer 27 is shaped to correct the parabolic functional relation between differential pressure and rate of flow, to the end that the pointer 25 will be positioned relative to the index 26 directly in accordance with rate of flow of the gases past the points of connection of the pipes 21, 22. Thus from the index 26 may be had a reading of the instantaneous value of the rate of flow of air after the mechanism has been properly adjusted and calibrated.

Suspended from the beam 25 is the stem 28 of a pilot valve 29 continually establishing a loading pressure directly representative of actual rate of air flow and effective through the pipe 30 within the chamber 31 of the relay 20.

In the general arrangement being described I preferably use all of the coke oven gas available through the conduit 9 and supplement such B. t. u. supply by pulverized fuel through the conduit 10. A rate of flow meter 32 is connected across an orifice 33, sensitive to pressure differential bearing a known relation to rate of flow of the coke oven gas through the orifice 33, and is adapted to position an indicator 34 relative to an index 35 directly in accordance with rate of flow of the coke oven gas. A pilot valve 36 is controlled by and with the pointer 34 to establish an air loading pressure in the pipe 37 directly representative of rate of coke oven gas supply through the conduit 9. The pipe 37 is connected to chamber 38 of the relay 20.

Figure 2:
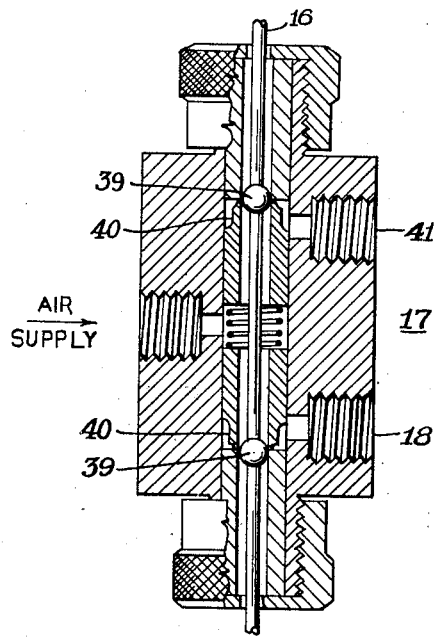
Fig. 2 is a sectional elevation of a pilot valve.

Referring now to Fig. 2 I shall describe the construction and functioning of the pilot valve assembly 17, which is representative of the other pilot valves illustrated in the arrangement of Fig. 1. The particular features and arrangement of the pilot valve assembly are disclosed and claimed in the patent to Johnson No. 2,054,464, but will be hereinafter explained in sufficient detail that an understanding may be had thereof.

The pilot stem 16 adapted for axial positioning through the agency of the Bourdon tube 13, carries two balls or lands in spaced relation to each other and to narrow annular ports 40. Air under pressure of approximately 25-40 pounds is available from any suitable source (not shown) as is indicated by the arrow at the left-hand side of the assembly and is available in the cylindrical bore of the pilot casing between the lands 39. In Fig. 2 the upper port 40 connects with the atmosphere through a threaded opening 41, whereas the lower port 40 communicates with the pipe 18. The arrangement is such that as the pilot stem 16 is moved downwardly, pressure within the pipe 18 increases, while if the stem 16 is moved upwardly then pressure within the pipe 18 decreases. There is a direct, although not necessarily linear, relation between fluid pressure within the pipe 18 and axial positioning of the stem 16. This pressure relation may be made linear or in curved relation dependent upon whether the lands 39 are cylindrical, conical, or of some other predetermined and calibrated shape. In the present instance it is only necessary to realize that a definite and predetermined pressure gradient may be established within the pipe 18 effective within the chamber 19 of the relay 20 for any desired range in steam pressure within the conduit 4 which positions the Bourdon tube 13. In other words, the design may be such that a full range in control or loading pressure effective within the chamber 19 may be had for only a slight variation in steam pressure. Or conversely, and as is preferred herein, there may be a considerable variation in steam pressure before there is any material variation in the loading pressure in the chamber 19. By a material change in steam pressure I mean that this might amount to a variation of a few pounds steam pressure out of a total of many hundreds. In some instances where the vapor generator is operating at high pressure, for example 1500 lb. per square inch gage, and is feeding directly to a topping turbine, it may be desirable to allow steam pressure to vary with load to as much as 20 or 30 pounds, or even more. In such case it would be desirable that variations in loading pressure through the pipe 18 occur and be effective within the chamber 19 only if the limits of desirable steam pressure fluctuation are passed. Thus the effect of steam pressure changes upon the relay 20 would be felt only if steam pressure departed in one direction or the other beyond certain predetermined limits.

Referring now in particular to Fig. 3, I show in more detail the arrangement of the differential relay designated in general at 20, and whose features are disclosed and claimed in the patent to Paul S. Dickey, No. 2,098,913, to which reference may be had for a more detailed description. Suffice it to say that the chambers 31 and 38 are separated by a diaphragm 42; while the chamber 19 is separated from a chamber 43 by a diaphragm 44. The chambers 38, 19 are separated by a partition 45. Diaphragms 42 and 44 are connected to move together with a stem 46, which is arranged to position a valve member 47 controlling air pressure within the chamber 43. Movement of the system comprising the diaphragms 42, 44, the member 46, and the valve beam 47, is opposed by a spring 48. Pressure within the chamber 43 is effective through a pipe 49 upon the pneumatic actuator 12 to position the damper 11.

It will be observed that a downward movement of the member 46 tends to admit air under pressure and increase pressure within the chamber 43. Thus an increase in pressure within the chambers 31 or 19 will tend to increase the pressure within the chamber 43 and is opposed by the spring 48 and/or by pressure within the chamber 38.

In operation I desire to proportion the total fuel supplied to the furnace in accordance with a measure of the air and to that end the loading pressure effective within the chamber 31, as established by the air flow meter, has primary control of the pressure effective through the pipe 49 for positioning the damper 11. As air flow increases and the beam 25 tends to rotate in a clockwise direction the stem 28 is moved upwardly, thus increasing the loading pressure effective through the pipe 30 within the chamber 31 and tending to open the damper 11 to increase the rate of supply of pulverized fuel. It will be observed that the pilot 29 is directly under control of the air meter and thus of the measure of air prior to any compensation which may have been hereinbefore mentioned.

In addition to the control of pulverized fuel supplied through the conduit 10 primarily in accordance with total air flow I have arranged that if steam pressure departs in one direction or the other beyond predetermined limits, then variations in loading pressure effective within the chamber 19 will assist, or act in the same direction as the pressure within the chamber 31, to increase pressure within the chamber 43 and consequently tend to open the damper 11. Thus if steam pressure falls below a predetermined value it will result in an increase in rate of supply of pulverized fuel, or an increase in B. t. u. liberation to bring the heat level (represented by steam pressure) back within predetermined desired limits.

The above is on the assumption that at all times all the available coke oven gas is being utilized in the furnace and that the control of pulverized fuel through the agency of the damper 11 is of that controllable portion of the B. t. u. supply above the base supply which is represented by coke oven gas.

Under normal operating conditions when a full flow of coke oven gas is available and is being utilized, the loading pressure effective through the pipe 37 within the chamber 38 is of a predetermined value in opposing the loading pressures in the chambers 19 and 31. As the flow of coke oven gas decreases, however, and to satisfy air flow or steam pressure demand for B. t. u. input, it becomes necessary to supply an additional amount of pulverized fuel, the pressure within the chamber 38 decreases and allows the pressures within the chambers 19, 31 to be more effective toward increasing pressure within the chamber 43 and correspondingly open the damper 11.

It will be seen by referring to Fig. 2 that the connections of the pipes 18, 30, 37 to the pilots 17, 29, or 36 is to either the upper or lower of the outlet connections dependent upon the desire for an increasing or decreasing of loading pressure with a raising or a lowering of the pilot stem.

Figure 4:
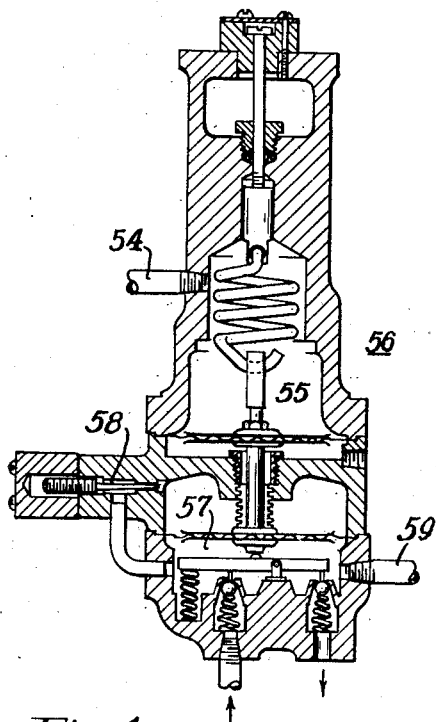
Fig. 4 is a sectional elevation of another type of relay.

I preferably control the liquid inflow or rate of supply of feed water through the conduit 5 to maintain a predetermined desired level 3 of liquid within the drum 2. A liquid level responsive device 50 is connected across the drum 2 and comprises a mercury U-tube having a movable float in one leg thereof adapted to position a pointer 51 relative to an index 52 and simultaneously to position a pilot valve 53 for establishing a loading pressure within the pipe 54 directly representative of liquid level within the drum 2. The loading pressure established by the pilot 53 is effective within a chamber 55 of a standardizing relay 56. Referring now to Fig. 4, which shows the standardizing relay 56 in more detail, it will be observed that the constructional arrangement is somewhat similar to the averaging relay 20 of Fig. 3. The standardizing relay is disclosed and claimed in the patent to Harvard H. Gorrie, No. 2,098,914, to which reference may be had for a more complete description thereof.

The particular feature involved herein through the use of the relay 56 is that a primary change is effected in the control pressure within the chamber 57 immediately upon change in loading pressure within the chamber 55, followed by a slow continuing regenerative action through the agency of the bleed valve 58. Control pressures established within the chamber 57 are effective through a pipe 59 for positioning the feed water regulating valve 7 in the conduit 5.

The regulating valve 7 is of a calibrated type and inasmuch as a constant differential thereacross is maintained by means of the excess pressure valve 6, then the throttling position of the valve 7 is indicative of rate of feed water flow through the conduit 5 and correspondingly the loading pressure within the pipe 59, which established the position of the valve 7, is in itself indicative of rate of feed water supply to the boiler 1.

Some of the air supplied to the furnace to support combustion is the carrier or primary air passing through the conduit 10. The remainder of the air is preferably supplied around the burners through the air box 8 and may be supplied under natural or forced draft. Control of a forced draft fan or of dampers may be had in known manner in accordance with absolute pressure values within the furnace 1 and to maintain such absolute pressure as desired. The same is not illustrated or described in more detail as it forms no part of the present invention.

Control of the total air utilized in combustion or in excess thereover, and regardless of its point of entry, is through the agency of a damper 60 positioned in the stack 61 through the agency of a pneumatic actuator 62 under the control of a loading pressure (through the pipe 63) established by a pilot valve 64. Preferably I control the supply of air for combustion (in the illustration by control of the damper 60) to attain optimum combustion efficiency and utilizing the steam flow—air flow relation as a guide.

To provide a measure of steam outflow I have located an orifice 65 in the conduit 4. The pipes 66, 67 lead pressures from the two sides of the orifice 65 to a differential responsive rate of flow meter 68 adapted to position an indicator 69 relative to an index 70 directly in accordance with rate of steam flow.

It will be appreciated that the indexes 26, 70 may in fact be the same index, so that the pointers 25, 69 may move in interrelation relative to a single index, or in fact may comprise corelated pen traces upon a single time-driven chart for record purposes.

Freely suspended from the arm 69 is a link 71 to whose lowermost end is pivotally attached one end of a floating beam 72. The other end of the beam 72 is pivotally suspended from a link 73, which in turn is pivotally suspended from a floating beam 74.

The beam 74 is positioned in part by and with the air flow beam 25 and its pilot stem 28, and in part through the agency of a compensating bellows 75. The bellows 75 is expanded or contracted responsive to a loading pressure within a pipe 76 from a chamber 77 of the averaging relay 78.

The relay 78 is similar to the relay 20, previously described, and receives two loading pressures, namely, from the pipes 30 and 59, and transmits an average or resultant pressure through the pipe 76. The pressure received from the pipe 30 is one representative of actual measured rate of air flow, while the one received from the pipe 59 is representative of water inflow to the boiler. Thus the pressure established in the pipe 76 is one representative of balance or unbalance between air flow and liquid inflow and results in a loading pressure effective within the bellows 75 to compensate the air flow measurement prior to interrelating it with steam flow for positioning the pilot 64.

The vertical link 73 is positioned primarily by the air flow meter, but such positioning is modified through the agency of the bellows 75 to provide a reading by the pointer 79 relative to the index 80 of true air flow measurement compensated for unbalance between air flow and feed water flow, to the end that the position of the member 73 is representative of what the air flow should read, taking into account the interrelation between actual water flow and actual steam flow. Thereafter a comparison of this compensated air flow to the actual steam flow gives a positioning of the pilot 64 to correct the actual air flow and properly satisfy desired relationship between a representation of B. t. u. liberated and B. t. u. absorbed.

In general, the control of air is from the steam flow—air flow relation. The air flow indication which enters into the steam flow—air flow relation is the true measure compensated for any possible unbalance between true air flow measure and water inflow measure, thus compensating the steam flow—air flow relation for momentary discrepancies between rate of liquid supply and rate of vapor outflow. The compensating is accomplished by means of a loading pressure effective in the bellows 75 established representative of unbalance between true air flow measure and water inflow measure and persists at a loading pressure away from normal so long as a discrepancy exists.

Water flow rate is balanced against true air flow rate in the averaging relay 78 and establishes a loading pressure to the compensator 75, which distorts the true air flow reading before it is compared to steam flow, and thus the apparent air flow which is compared to steam flow is the air flow which would be the true measured air flow if the actual flow of air were changed to take into account the fact that water inflow is not at that amount the same as the steam flow, i. e. the heat storage input in the feed water (rate times unit content) relative to heat (rate times unit content) of outflow.

The steam flow—air flow relation then adjusts the total flow of air and products of combustion to bring the actual air flow to agree with the distorted air flow, whereby the actual air flow is corrected to be what it should be for any discrepancy between water inflow and steam outflow.

While I have chosen to illustrate and describe a certain preferred arrangement of apparatus in connection with the method or methods of operating a vapor generator which I have invented, it will be realized that my method or methods may be performed with other arrangements of apparatus, and that I am not to be limited hereby, except as to the claims in view of prior art.

What I claim as new and desire to secure by Letters Patent of the United States is:

1. A relation indicator for a vapor generator having liquid, fuel, and air supply means; comprising in combination, a meter of the total air and gases of combustion, means modifying the manifestations of said meter in accordance with the difference between the rate of liquid supply and the rate of flow of the total air and gases of combustion, a meter of the rate of vapor outflow, means for continuously indicating the ratio between said modified air flow and vapor outflow rate, and means for controlling the air supply to maintain said ratio at a predetermined value.

2. A relation indicator for guiding the control of supply of air to a vapor generator having liquid, fuel, and air supply means; comprising in combination, a meter of the air flow, means modifying the reading of said air flow meter in accordance with the difference between the liquid inflow rate and the rate of air flow, a meter of vapor outflow, means correlating the readings of modified air flow and of vapor outflow, and means for controlling the air supply to maintain a predetermined correlation between the rate of vapor outflow and modified reading of the air flow meter.

3. A relation indicator for guiding the control of supply of air to a vapor generator having liquid, fuel, and air supply means; comprising in combination, a meter of the air flow, means modifying the reading of said air flow meter in accordance with changes in liquid storage in the vapor generator, a meter of vapor outflow, means correlating the readings of modified air flow and of vapor outflow, and means for controlling the air supply to maintain a predetermined correlation between the rate of vapor outflow and modified reading of the air flow meter.

4. A relation indicator for a vapor generator having liquid, fuel, and air supply means; comprising in combination, a meter of the air and gases flowing through the generator, means continually modifying the reading of said meter responsive to departure of air flow and liquid inflow from predetermined relation, a meter of a variable in the output of the vapor generator, means continuously indicating relation between said modified air flow reading and the reading of the last named meter, and means for controlling the air supply to maintain the relationship between said variable and the modified reading at a predetermined value.

5. Apparatus for automatically controlling the supply of air for combustion in a vapor generator, comprising in combination, a measuring device of air supply, a measuring device of generator output, means for continuously comparing the measurements relative to predetermined relation, means indicative of the difference between the rate of liquid and air supply continuously effective in modifying the measure of air flow before it is compared with the measure of generator output, and means for automatically controlling the air supply responsive to said first named means to maintain said predetermined relation between said measurements.

6. Apparatus for controlling the air supply to a vapor generator, comprising in combination, a meter of the air flow, means modifying the indications of said air flow meter in accordance with the difference between rate of liquid and air supply, a meter of vapor outflow, means correlating the indications of modified air flow and of vapor outflow, and control means for the air supply operated by said last named means to maintain a predetermined ratio between the rate of vapor outflow and modified air flow.

7. A relation indicator for guiding the control of supply of air to a vapor generator having liquid, fuel and air supply means; comprising in combination, a meter of the rate of vapor outflow, a meter of the air flow, means responsive to the difference between the rate of liquid input to the generator and rate of air flow through the generator for modifying the reading of the air flow meter in correspondence with said difference, means for correlating the readings of modified air flow and of vapor outflow, and means for controlling the rate of air supply to maintain a predetermined correlation between the readings of modified air flow and of vapor outflow.

8. A control system for a vapor generator having liquid, fuel, and air supply means; comprising in combination, a meter of the total air and gases of combustion, means modifying the manifestations of said meter in accordance with the difference between the rate of liquid supply and the rate of flow of the total air and gases of combustion, a meter of the rate of vapor outflow, means for continuously indicating the ratio between said modified air flow and vapor outflow rate, means for controlling the air supply to maintain said ratio at a predetermined value, means responsive to the rate of modified air flow for causing the rate of delivery of fuel to the furnace to be in proportion to and to vary with the rate of modified air flow, and means responsive to changes in vapor pressure for so modifying the rate of delivery of fuel to the furnace that for any given ratio of vapor outflow to air flow, the rate of delivery of fuel is increased when the vapor pressure tends to decrease and decreases the rate of fuel delivery when the vapor pressure tends to increase.

9. A control system for a vapor generator having liquid, fuel, and air supply means; comprising in combination, a meter of the total air and gases of combustion, means responsive to liquid flow for modifying the manifestation of said meter, a meter of the rate of vapor outflow, means for continuously indicating the relation between said air flow and vapor outflow rate, means for controlling the air supply to maintain said relation at a predetermined value, means responsive to the rate of air flow for causing the rate of delivery of fuel to the furnace to be in proportion to and to vary with the rate of air flow, and means responsive to changes in vapor pressure for so modifying the rate of delivery of fuel to the furnace that for any given relation of vapor flow to air flow the rate of delivery of fuel is increased when the vapor pressure tends to decrease and decreases the rate of fuel delivery when the vapor pressure tends to increase.

GEORGE W. SAATHOFF.